United States Patent [19]

Van Hekle

[11] 4,182,679

[45] Jan. 8, 1980

[54] OIL SKIMMER

[75] Inventor: Paul Van Hekle, Newark, Del.

[73] Assignee: Ralph Watts

[21] Appl. No.: 917,155

[22] Filed: Jun. 20, 1978

[51] Int. Cl.² ............................................. E02B 15/04
[52] U.S. Cl. ........................... 210/242 S; 210/DIG. 25
[58] Field of Search .................. 210/83, 242, DIG. 25

[56] References Cited

U.S. PATENT DOCUMENTS

| | | | |
|---|---|---|---|
| 2,876,903 | 3/1959 | Lee | 210/242 |
| 3,219,190 | 11/1965 | Thune | 210/242 |
| 3,237,774 | 3/1966 | Schuback | 210/242 |
| 3,348,690 | 10/1967 | Cornelissen | 210/242 |
| 3,630,376 | 12/1971 | Price | 210/242 |
| 3,756,414 | 9/1973 | Crisafulli | 210/242 |
| 3,815,751 | 6/1974 | Povlouc | 210/242 |
| 3,909,416 | 9/1975 | Veld | 210/242 |
| 3,951,810 | 4/1976 | Crisafulli | 210/242 |
| 4,033,869 | 7/1977 | McGrew | 210/242 |
| 4,119,541 | 10/1978 | Makaya | 210/242 R |

*Primary Examiner*—Theodore A. Granger
*Attorney, Agent, or Firm*—Connolly and Hutz

[57] ABSTRACT

Floating mineral substances such as oil or petroleum are separated from water by collecting the mixture in the inlet of a separator tank having a generally L-shaped baffle with surface irregularities formed on the vertical wall of the baffle and with the mixture flowing through the bottom wall into a pyramidal shaped storage section which by means of its shape causes the water to flow downwardly into the storage section and the oil to float on top into an oil chamber, with pumps being provided to remove the oil from the oil chamber and to maintain the water at the proper level in the storage section.

19 Claims, 8 Drawing Figures

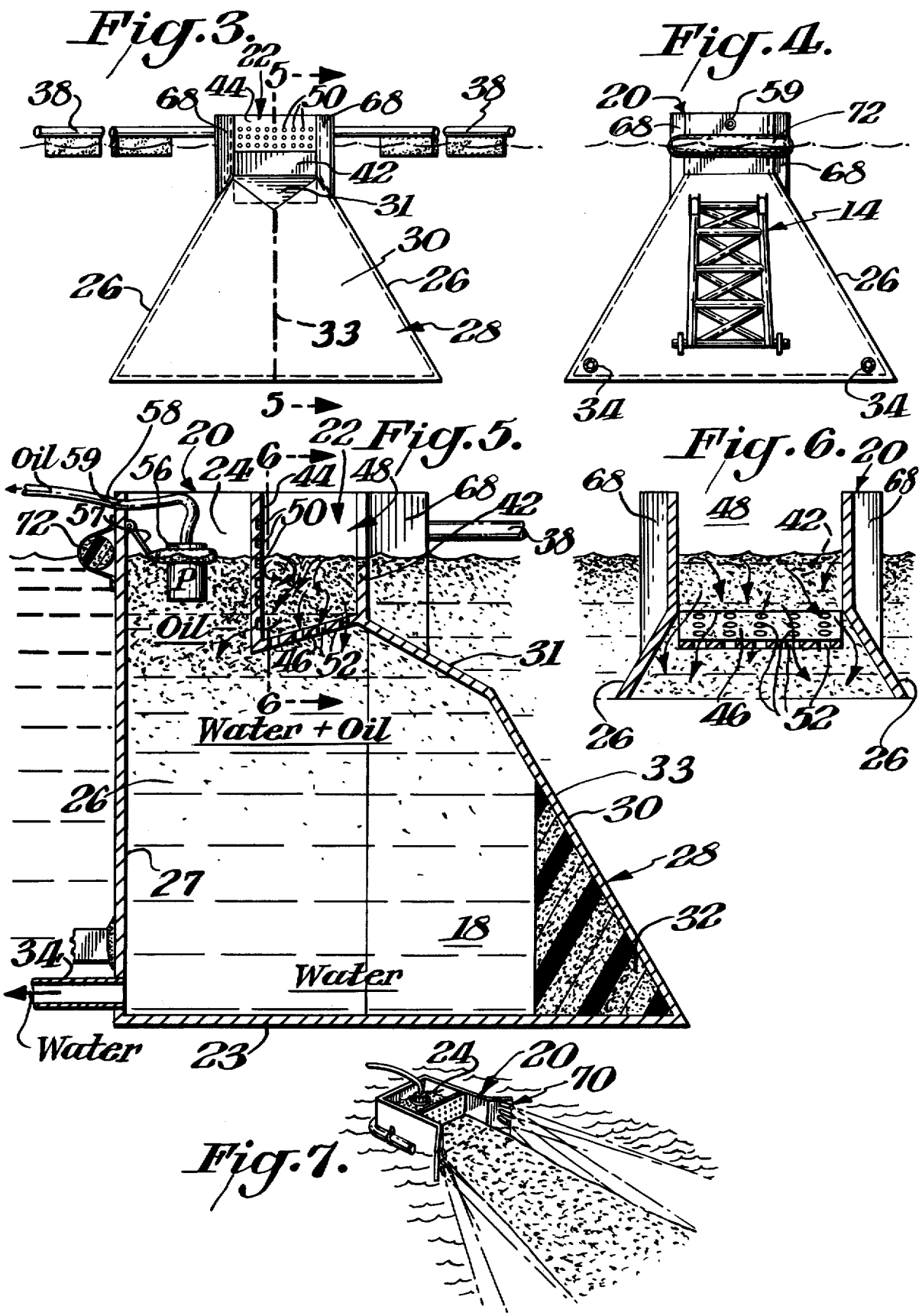

OIL SKIMMER

BACKGROUND OF THE INVENTION

One of the most serious problems from an environmental standpoint is the damage caused by oil spills or other minerals which float on the water. The acuteness of this problem has resulted in intensive efforts to provide a satisfactory device generally referred to as an oil skimmer which will clean these impurities from the water surface. Exemplary approaches at such oil skimmers are found in U.S. Pat. Nos. 61,880; 3,700,108; 3,708,077; 3,757,953; 3,804,251; 3,923,661; 3,957,646; 4,006,086; 4,033,869; 4,049,554 and 4,056,472.

It is highly desirable in cleaning such oil spills to provide a method and device which is not only of a simplified nature, but is so without sacrifice to its efficiency or without sacrifice to the wide variety of conditions both climatewise and geographically under which it may operate.

SUMMARY OF THE INVENTION

An object of this invention is to provide an oil skimming device which is highly efficient in operation and yet simple in structure.

A further object of this invention is to provide such a device which uses known scientific principles to draw the mixture of oil and water into the device and separate the components of the mixture in an efficient manner.

A still further object of this invention is to provide a device for effectively separating oil or other floating substances from water without sacrifice to the simplicity thereof.

In accordance with this invention floating mineral substance such as oil or petroleum is separated from water by collecting the mixture in the inlet of a separator tank having a generally L-shaped baffle with surface irregularities formed on the vertical wall of the baffle and with the mixture flowing through the bottom wall into a pyramidal shaped storage section which by means of its shape causes the water to flow downwardly into the storage section and the oil to float on top into an oil chamber, with pumps being provided to remove the oil from the oil chamber and to maintain the water at the proper level in the storage section.

The leading face of the tank is preferably plow-shaped with a tip at the frontmost lowermost portion thereof and with floating means provided in the tip.

In a preferred form of this invention water is withdrawn from the storage section at opposite sides and in the lower portion thereof to facilitate the separation operation. The bottom wall of the inlet chamber is also preferably perforated and inclined upwardly at an acute angle away from the vertical back wall of the L-shaped baffle which forms the inlet chamber and the surface irregularities on the back wall are depressions formed by partial perforations therein. The juncture of the back wall and bottom wall preferably extends below the juncture of the slanted pyramidal walls and the vertical walls of the inlet chamber so that a space or opening is created whereby some of the oil from the mixture may flow around the back wall from the inlet chamber directly to the oil chamber.

THE DRAWINGS

FIG. 3 is a front elevation view partly broken away of the oil skimming device shown in FIGS. 1-4;

FIG. 4 is a rear elevation view of the oil skimming device shown in FIG. 3 without gates;

FIG. 5 is a cross-sectional view taken through FIG. 3 along the line 5—5;

FIG. 6 is a cross-sectional view taken through FIG. 5 along the line 6—6; and

FIGS. 7-8 are pictorial views of oil skimming devices in accordance with a further embodiment of this invention.

DETAILED DESCRIPTION

In the following description reference is made to an oil skimmer or to oil floating on water. It is to be understood, however, that the invention has application to separating any floating substance or impurity from any liquid and the various references to oil or oil floating on water is not intended to be limiting but is used since that is a particularly advantageous use of the invention. Thus, for example, the invention may be used for collecting sludge below water where the sludge is the heavier substance.

Figure 1:
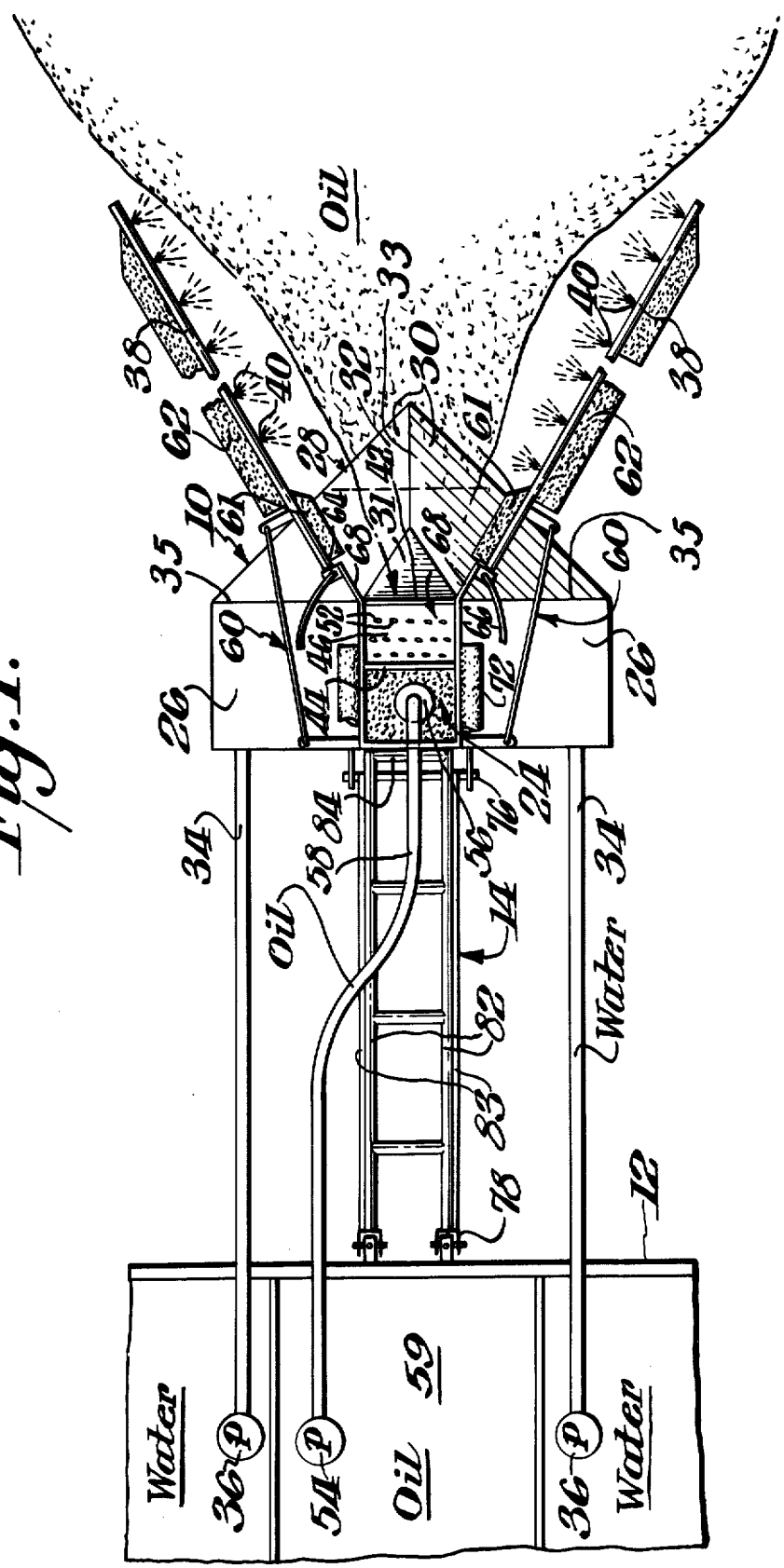
FIG. 1 is a top plan view of an oil skimming device in accordance with this invention.
Figure 2:
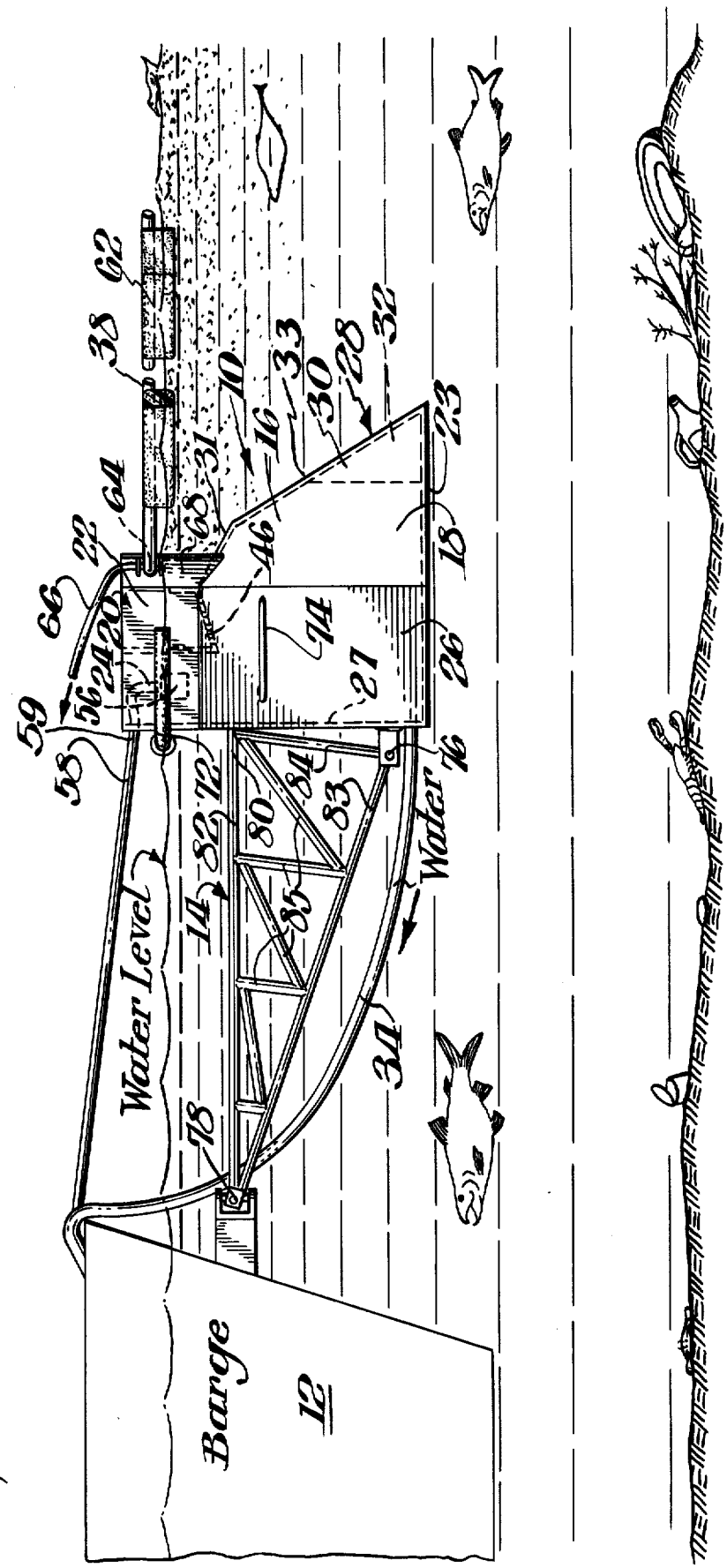
FIG. 2 is a side elevation view partly in section of the oil skimming device shown in FIG. 1.

FIGS. 1-2 show an oil skimming device or module 10 in accordance with this invention. In the illustrated embodiment device 10 is mounted to the front of a barge vessel such as 12 by means of a boom 14 as later described. Device 10 includes a separator tank 16 which has a pyramidal shaped storage section 18 at the lower portion thereof and a vertical section of generally rectangular cross-section as the top section 20 thereof. Top section 20 is divided into an inlet chamber 22 and an oil chamber 24. As is apparent from FIGS. 1-4, storage section 18 of tank 16 is of pyramidal shape in the sense not only that its side walls 26 converge upwardly and inwardly toward the top section 20 (FIGS. 3-4) but also that its leading face or front wall 28 is plow-shaped with upwardly and inwardly sloping sides or panels. As is apparent from FIGS. 1-3 the wall sections or 30 at the lowermost portion of leading face 28 are inclined at a relatively steep angle and come together at a point while the upper portion 31 is inclined at a shallower angle to form a triangular transition section which is joined to top section 20 at its lower edge at the juncture with bottom section 18. As shown in FIGS. 1-3 each panel 30 of the front wall has an adjacent edge and a remote edge 35 with the adjacent edges joined together to form an upwardly directed pointed front leading edge 33 of the tank while the remote edges 35 are connected to its adjacent side wall 26. As shown in FIG. 5 rear wall 27 is vertical and perpendicular to bottom wall 23. The tip of plow 28 contains float means 32 which may, for example be a suitable buoyant material such as styrafoam or if desired may be a sealed off section filled with air or other buoyant gas.

A pair of outlet lines 34 are provided at opposite corners in the lower portion of tank 18 and connected to reversible pumps 36 on barge 12. At the beginning of operation a sufficient amount of water is pumped into tank 16 through lines 34 to cause tank 16 to partially submerge with the storage section 18 being below the water surface and with the inlet 22 at the water surface as later described.

Containing means are provided for cutting into the water to isolate a portion of the mixture of the water and oil and assist in funneling it to device 10. In the embodiment illustrated in FIGS. 1–3 the containing means is in the form of a pair of hollow gates 38 mounted to top section 20. Gates 38 are provided with plurality of nozzles 40 through which a suitable fluid such as air or water may be sprayed to create a solid curtain which cuts through the water to gather and funnel the mixture into the partially submerged tank 16. At the beginning of operation when the tank becomes partially submerged a whirlpool effect is created at the inlet 20 which in effect is a hole created in the water so that the mixture is sucked therein. Once the mixture begins to flow into device 10, as the device is moved in the water, the mixture continues to be sucked therein for separation as later described.

As best shown in FIGS. 5–6 the inlet chamber 22 includes a vertical front wall 42, a generally vertical back wall 44 and a bottom wall 46 connected therebetween. Back wall 44 and bottom wall 46 in effect form a generally L-shaped baffle. Bottom wall 46 may be horizontal but in the preferred form of this invention is inclined upwardly in an acute angle with respect to the horizontal toward front wall 42. Front wall 42 terminates immediately below the water surface so that an opening or open area 48 is created by the remainder of the front face through which the mixture may flow. Vertical wall 44 contains surface irregularities in the form of depressions 50 created by partial perforations therein. The function of the surface irregularities is to minimize the turbulence of the mixture flowing therein. Bottom wall 42 contains holes or complete perforations 52 through which the mixture may flow and the inclination thereof of bottom wall 42 increases the time before which the mixture flows through perforations 52 so as to enhance the separation.

The pyramidal shape of storage section 18 is such that the horizontal cross-sectional area thereof generally increases in accordance with the distance from the inlet chamber 22 and toward its bottom wall 23. Storage section 18 below inlet chamber 22 is thus of expanding capacity from inlet chamber 22 toward the horizontal base 23 of tank 16. This pyramidal shape serves a number of functions. For example, because of the shape the separation of the oil from the water is enhanced with the water flowing to the bottom thereof and the oil floating at the top thereof where the rising oil level causes the oil to flow into oil chamber 24 disposed behind inlet chamber 22. Additionally, the pyramidal shape of the external wall stabilizes tank 16 particularly in rough water. Moreover, the plow-shaped front face facilitates the movement of tank 16 through the water.

As best shown in FIGS. 5–6, the juncture of bottom wall 46 and back wall 44 is located below the juncture of the sloping walls 26 of storage section 18 and top section 20. As illustrated in FIG. 6, an open space is thereby created between these junctures in the lower portion of back wall 44 which is not connected to any other walls, such that some of the oil may flow from the inlet chamber directly to the oil chamber by flowing around back wall 44 in this open area.

FIG. 5 also illustrates the provisions of an oil pump 54 on barge 12 which communicates with oil chamber 24 by means of hose 58 leading to suction head 56 which floats on the oil surface so as to remain in contact therewith regardless of the level of oil in chamber 24. A vertical guide mechanism 57 of any suitable form connects head 56 to the back wall of oil chamber 24 with hose 58 extending through hole 59 in the back wall. Because of the various possible positions of suction head 56, hose 58 is flexible to permit changes in position. Mounting hose 58 through hole 59 acts as an anchorage to control the amount of hose 58 within chamber 24 and thereby not impair the efficiency of suction head 56. Oil drawn through suction head 56 discharges into an oil disposal tank 59 (FIG. 1).

As best illustrated in FIG. 1, pivotally secured to tank 16 are gates 38, supported by elongated braces 60. Braces 60 may be extensible in length, in any suitable manner, so as to accommodate the pivotal connections 64 of gates 38 to separator tank 16. Fluid such as air or water is fed through hoses 66 from any suitable source such as from barge 12 and discharges through nozzles 40 in gates 38. By suitable control means (not illustrated) such as solenoids, gears, etc., the position of gates 38 with respect to each other can be adjusted to control the angle therebetween. Gates 38 preferably include a section mounted permanently to top 20 with detachable sections mounted thereto. The detachable sections having nozzles 40 may include telescopic portions for varying the lengths thereof.

FIGS. 1–3 illustrate floats 61 mounted to gates 38 at their connection to top section 20. In addition to floats 61, gates 38 have depending therefrom elongated floats 62 to maintain the level of gates 38 and to assist in isolating the mixture, although floats 62 are not as essential as floats 61.

FIGS. 1–2 show a further feature of this invention wherein a pair of angularly inclined solid shield members or cutters 68 are provided diverging away from inlet 22 to physically cut into the water and facilitate drawing the mixture into the inlet chamber.

FIG. 7 shows an alternative arrangement for cutting into the water and isolating a part of the mixture. In the form illustrated therein fluid jets 70 are provided on each side of inlet 20 and the fluid emanating therefrom creates a solid curtain which cuts into and isolates a portion of the mixture. In this embodiment physical cutters 68 may also be provided.

Figure 8:
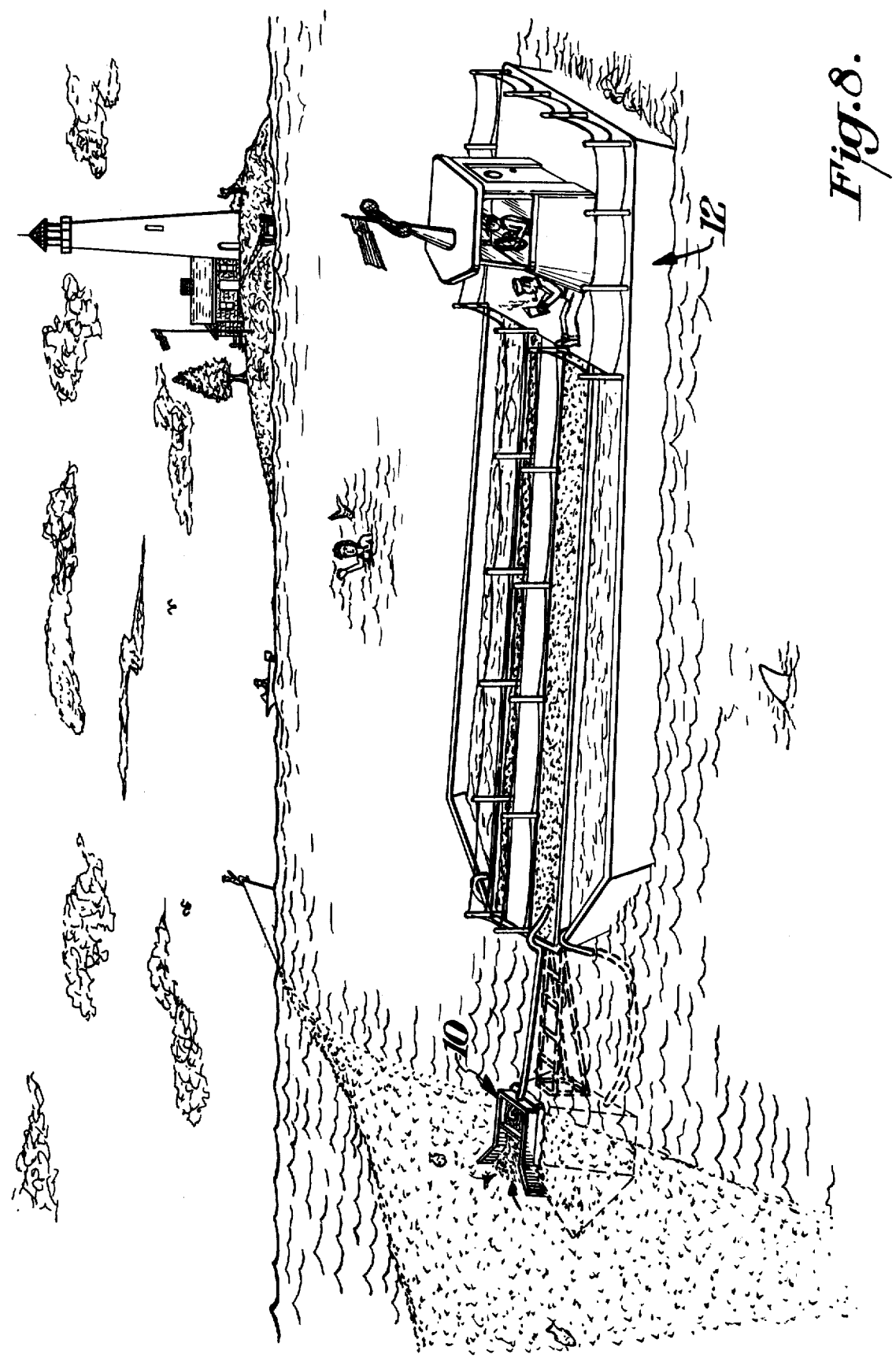

If desired, as best shown in FIG. 8, such containing means as fluid jets, gates, etc, may be completely omitted and, for example, the separator tank 16 may simply be placed within the spill area and then submerged to create the suction effect by drawing the mixture into the separator tank. By use of a barge or by even having a self-propelled means on separator tank 16 the separator tank would then move throughout the spill area to effect the cleaning operation.

A further ramification of this invention, not illustrated, has particular adaptability for shallow water, marshes or beach washing. In such conditions a portable pump would be provided having a floating suction nozzle placed, for example, in the center of a convex plate with the pump riding just above the water surface. By using high pressure hoses with a spray nozzle, the mixture can be washed toward the suction hose and pumped from there to a separator tank 16 so that the oil can be separated from the water as previously described.

The invention may similarly be practiced where tank 16 is not in water but is on land, such as on a truck bed, and a mixture brought to it (as by a pump) for separation.

FIGS. 1–2 illustrate additional features of this invention which are particularly desirable. As indicated therein, floatation means in the form of a horseshoe shaped buoyant collar 72 is provided around top section 20 at the water level to aid in maintaining the stability of the separator tank. The bight of collar 72 in back of top section 20 is of greater diameter than the legs along the side of top section 20. It is not necessary to use the specific shape of floatation means illustrated although the horseshoe shape is particularly advantageous since it maximizes the buoyant area while being as close as possible to the separator tank.

As also illustrated in FIGS. 1-2 fins 74 are mounted on the sloping side walls 26 of separator tank 16 to control the disposition of the partially submerged tank. Although not illustrated electric float controls may be provided for stabilizing fins 74 to compensate for any operator's errors in the positioning of fins 74.

Along the same lines the pumps for the oil and water may also be provided with independent variable controls to regulate the gallons per minute and thus compensate for differences which occur in water currents, wind conditions and speed of the device.

FIGS. 1-2 illustrates the details of boom 14 attached to the bow of a vessel such as barge 12. As indicated therein the boom is of generally triangular form having a first corner 76 formed by arms 83, 84, pivotally connected to the lower portion of tank 16 the vertical rear wall 27. A second corner 78 is formed by arms 83, 82 (with braces 85 therebetween) and is pivotally connected to the barge 12. The axis of rotation of the first corner 76 is perpendicular to the second corner 78 so as to provide a universal joint type movement. Third corner 80 is disposed generally above first corner 76 in the general area of separator tank 16 but free of any connection thereto. It is to be noted that the angle of arms 82, 84 forming third corner 80 is slightly less than being perpendicular to each other. In this manner the arm 82 is maintained generally horizontal when the third corner 80 abuts against the vertical rear wall of separator tank 16. During the forward movement of barge 12 corner 80 continues to push against separator tank 16 and thereby acts as a transmission means for the driving force imparted by barge 12. Since there is no physical connection between third corner 80 and separator tank 16 and because of the universal pivots, in rough water it is possible for third corner 80 to move away from separator tank 16 and because of the various floatation means provided on the separator tank the tank maintains its proper orientation and level in the water.

During operation oil is pumped from chamber 24 into, for example, one of several tanks 59 on recovery vessel 12. The water in collection section 16 is likewise pumped as separator tank becomes about ½ or ¾ full until the smallest amount of water possible for liquid in the tank remains. The water is preferably then discharged into uncollected floating substance.

The concepts of this invention may be practiced in various manners and not simply with the structure illustrated and described herein. For example, a perforated trash guard may be mounted in front of the inlet to screen large debris which might otherwise flow into the inlet chamber and interfere with the efficiency of the separating process. As previously noted, the separator tank itself may be mounted in front of a barge or other powered vessel or may be provided with its own power means. Similarly, various forms of containing means may be provided such as the illustrated gates and fluid jets with or without such aids as the shields or cutters mounted adjacent the inlet for physically cutting into the water, or the containing means may be omitted entirely (FIGS. 4 and 8) and the separator tank simply moved about through the area being treated. Similarly, although the L-shaped baffle is described as having the perforations 52 in the bottom wall 46 such perforations may also, or instead, be in the lower portion of the back wall 44.

Oil skimming device 10 could be located stationary within a spillage area that has been encircled by booms or retaining floats and the oil would be pumped from the skimmer 10 to a detached barge 12 outside the encircled area.

As should be apparent device 10 thus provides a highly efficient yet simplified manner of cleaning oil spills or otherwise separating floating substances such as petroleum from liquid such as water. Within the guidelines set forth therein the invention may be practiced utilizing various ramifications thereof alone or in combination therewith.

What is claimed is:

1. An oil skimming module for mounting on the bow of a vessel for separating oil or the like floating on water from the water comprising a separator tank having a top section connected to and communicating with a bottom section therebeneath, said top section being divided into an inlet chamber for receiving a mixture of oil floating on the water and an oil chamber for receiving the separated oil, containing means mounted to said separator tank for directing the mixture into said inlet chamber, said inlet chamber having a front wall and a back wall opposite therefrom and a bottom wall connected therebetween, said front wall having an opening to permit the mixture to pass into said inlet chamber formed by said walls, said back wall of said inlet chamber and said bottom wall forming a generally L-shaped baffle, said back wall of said inlet chamber having surface irregularities to minimize turbulence from the mixture entering said inlet chamber, the lower portion of said L-shaped baffle being perforate to permit the mixture to pass therethrough into said bottom section, the external walls of said bottom section of said tank defining a storage section for the mixture passing therein, said external walls of said bottom section including a bottom wall and a front wall and a rear wall and a pair of side walls, said side walls of said bottom section converging from said bottom wall upwardly toward each other and being connected to the lower edge of said top section at the juncture of said top section and said bottom section, said front wall of said bottom section comprising a pair of panels converging from said bottom wall upwardly toward each other and toward said lower edge of said top section, each of said panels having an adjacent edge and a remote edge, said adjacent edges of said panels being joined together to form an upwardly and backwardly directed pointed front leading edge for said tank, each of said remote edges of said panels being connected to its adjacent side wall of said bottom section, the horizontal cross-sectional area of said storage section of said tank increasing with the distance away from said inlet chamber toward said bottom wall of said bottom section and said tank thereby having increasing capacity away from said inlet chamber toward said bottom wall of said bottom section, said oil chamber in said separator tank being above and in flow communication with said storage section and in back of said inlet chamber, said back wall of said inlet chamber comprising the front wall of said oil chamber, oil pump means communicating with said oil chamber for withdrawing oil therefrom, and water pump means communicating with said storage section for controlling the level of water therein.

2. The device of claim 1 wherein said front wall includes a backwardly inclined triangular transition section having one edge connected to said lower edge of said top section and each of its other two edges connected to a respective one of said panels, and said transition section being inclined at a steeper angle than the inclination of said panels.

3. The device of claim 2 wherein said rear wall of said bottom section is vertical and is perpendicular to said bottom wall of said bottom section.

4. The device claim 1 wherein said rear wall of said bottom section is vertical and is perpendicular to said bottom wall of said bottom section.

5. The device of claim 1 wherein water outlet lines are connected to and communicate with said storage section at opposite sides of and in the lower portion of said storage section, and said water pump means being operatively connected to said water outlet lines.

6. The device of claim 5 wherein said bottom wall of said inlet chamber is perforate and is inclined upwardly away from said back wall of said inlet chamber to an acute angle with respect to the horizontal, and said back wall being vertical.

7. The device of claim 6 wherein said surface irregularities in said back wall are depressions formed by partial perforations therein.

8. The device of claim 7 wherein, the juncture of said inlet chamber back wall and bottom wall is below said juncture of said bottom section and said top section, and said oil chamber and said inlet chamber communicating with each other in the area between said junctures whereby some oil may flow from said inlet chamber directly to said oil chamber without passing through said bottom wall of said inlet chamber.

9. The device of claim 8 wherein said containing means comprises a pair of elongated gates secured to said separator tank at said top section and diverging away therefrom, and said gates containing means for spraying a fluid into the water.

10. The device of claim 9 wherein shields are connected to said gates in the area of said inlet chamber externally thereof for physically cutting into the oil-water mixture, float means mounted on said gates for maintaining said gates at the proper level above the water, and said gates being pivotally connected to said top section whereby this angle between said gates may vary.

11. The device of claim 8 wherein said containing means comprises fluid jet means on said top section for shooting a curtain of fluid into the water along a pair of lines diverging away from said top section.

12. The device of claim 8 including float means connected to said top section, and stabilizing fins being mounted on opposite sides of said separator tank at said storage section.

13. The device of claim 8, in combination with a barge as said vessel, a generally triangular boom connecting said barge to said separator tank, a first corner of said boom being pivotally connected to said barge, a second corner of said boom being pivotally connected to rear wall of said separator tank at a lower portion thereof, the third corner of said boom being located generally above said second corner in the general area of said separator tank and free of any connection thereto, the pivotal axes of the connections of said first vorner to said barge and said second corner to said tank being perpendicular to each other, and the legs of said boom forming said third corner being non-perpendicular with respect to each other.

14. The device of claim 8 wherein said oil pump means includes a floating suction head for maintaining suction communication with the oil in said oil chamber regardless of the level of the oil therein, a flexible discharge hose connected to said suction head and leading away from said separation tank to an oil disposal area, and said hose extending through a hole in said tank.

15. The device of claim 1 wherein said bottom wall of said inlet chamber is perforate and is inclined upwardly away from said back wall of said inlet chamber to an acute angle with respect to the horizontal, and said back wall being vertical.

16. The device of claim 1 wherein said surface irregularities in said back wall are depressions formed by partial perforations therein.

17. The device of claim 1 wherein, the juncture of said inlet chamber back wall and bottom wall is below said juncture of said bottom section and said top section, and said oil chamber and said inlet chamber communicating with each other in the area between said junctures whereby some oil may flow from said inlet chamber directly to said oil chamber without passing through said bottom wall of said inlet chamber.

18. The device of claim 1 including float means in the tip of said front wall adjacent said bottom wall of said bottom section, and said separator tank being capable of being submerged with said inlet chamber at the water surface to create a whirlpool effect at said inlet whereby the hole created thereat causes the mixture to be drawn into said inlet.

19. The device of claim 1 including conveying means remote from said separator tank for conveying the mixture to said inlet regardless of whether said tank is mounted on land or in water.

* * * * *